United States Patent
Guo

(10) Patent No.: US 9,693,004 B2
(45) Date of Patent: Jun. 27, 2017

(54) SIGNAL EMITTING APPARATUS, SIGNAL RECEIVING APPARATUS, SIGNAL PROCESSING METHOD AND DISPLAY SYSTEM

(71) Applicant: BOE TECHNOLOGY GROUP CO., LTD., Beijing (CN)

(72) Inventor: Weiqing Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 13 days.

(21) Appl. No.: 14/436,717

(22) PCT Filed: Nov. 10, 2014

(86) PCT No.: PCT/CN2014/090743
§ 371 (c)(1),
(2) Date: Apr. 17, 2015

(87) PCT Pub. No.: WO2015/149522
PCT Pub. Date: Oct. 8, 2015

(65) Prior Publication Data
US 2015/0381920 A1    Dec. 31, 2015

(30) Foreign Application Priority Data

Apr. 1, 2014    (CN) .......................... 2014 1 0129453

(51) Int. Cl.
*H04N 5/44*    (2011.01)
*G06F 3/01*    (2006.01)
(Continued)

(52) U.S. Cl.
CPC ............. *H04N 5/4403* (2013.01); *G06F 3/01* (2013.01); *G08C 17/00* (2013.01);
(Continued)

(58) Field of Classification Search
CPC .......... H04N 5/4403; H04N 21/42222; H04N 2005/4416; H04N 2005/4428; G08C 17/00; G06F 3/01; G06F 2203/04102
(Continued)

(56) References Cited

U.S. PATENT DOCUMENTS

| | | | |
|---|---|---|---|
| 2007/0176894 A1* | 8/2007 | Abe ..................... | H04N 5/4403 345/156 |
| 2010/0164888 A1* | 7/2010 | Okumura .............. | G06F 1/1626 345/173 |

(Continued)

FOREIGN PATENT DOCUMENTS

| | | |
|---|---|---|
| CN | 101699851 A | 4/2010 |
| CN | 101939999 A | 1/2011 |

(Continued)

OTHER PUBLICATIONS

Feb. 13, 2015—(WO)—International Search Report and Written Opinion PCT/CN2014/090743 with English Tran.

(Continued)

*Primary Examiner* — Ibrahim Khan
(74) *Attorney, Agent, or Firm* — Banner & Witcoff, Ltd.

(57) ABSTRACT

Provided are a signal emitting apparatus, a signal receiving apparatus a signal processing method and a display system, wherein a remote controller can be deformed by applying a force to it, and a remote controlling signal is transmitted to a display apparatus to perform image displaying. The signal emitting apparatus comprises: a first receiving unit configured to receive a deformation operation input by a user, wherein the signal emitting apparatus is deformed under the deformation operation to generate a deformation quantity; a signal generating unit configured to generate a control signal (Continued)

according to the deformation quantity; and a signal transmitting unit configured to transmit the control signal to the signal receiving apparatus.

18 Claims, 7 Drawing Sheets

(51) Int. Cl.
  H04N 21/422 (2011.01)
  G08C 17/00 (2006.01)
(52) U.S. Cl.
  CPC ........... H04N 21/42222 (2013.01); *H04N 2005/4416* (2013.01); *H04N 2005/4428* (2013.01)
(58) Field of Classification Search
  USPC .................................. 345/156–175
  See application file for complete search history.

(56) References Cited

U.S. PATENT DOCUMENTS

| | | | | |
|---|---|---|---|---|
| 2011/0291938 A1* | 12/2011 | Wu | ............. | G06F 3/044 345/168 |
| 2013/0203469 A1* | 8/2013 | Cho | ............. | G06F 3/04886 455/566 |
| 2013/0229339 A1* | 9/2013 | Takahata | ............. | G06F 3/0362 345/156 |
| 2013/0265221 A1* | 10/2013 | Lee | ............. | G06F 3/01 345/156 |
| 2013/0275873 A1* | 10/2013 | Shaw | ............. | G01S 3/8006 715/716 |
| 2014/0101560 A1* | 4/2014 | Kwak | ............. | G06F 1/1652 715/738 |
| 2014/0174781 A1* | 6/2014 | Do | ............. | H02G 3/16 174/59 |
| 2015/0187325 A1* | 7/2015 | Yeo | ............. | H04N 5/4403 345/156 |

FOREIGN PATENT DOCUMENTS

| | | |
|---|---|---|
| CN | 102364544 A | 2/2012 |
| CN | 202217244 U | 5/2012 |
| CN | 103365594 A | 10/2013 |
| CN | 103957440 A | 7/2014 |

OTHER PUBLICATIONS

Sep. 2, 2016—(CN)—First Office Action Appn 201410129453.4 with English Tran.

Apr. 17, 2017—(CN)—Office Action Appn 201410129453.4 with English Translation.

* cited by examiner

SIGNAL EMITTING APPARATUS, SIGNAL RECEIVING APPARATUS, SIGNAL PROCESSING METHOD AND DISPLAY SYSTEM

The application is a U.S. National Phase Entry of International Application No. PCT/CN2014/090743 filed on Nov. 10, 2014, designating the United States of America and claiming priority to Chinese Patent Application No. 201410129453.4 filed on Apr. 1, 2014. The present application claims priority to and the benefit of the above-identified applications and the above-identified applications are incorporated by reference herein in their entirety.

TECHNICAL FIELD OF THE DISCLOSURE

The present disclosure relates to the field of display technology, in particular, to a signal emitting apparatus, a single receiving apparatus, a signal processing method and a display system.

BACKGROUND

With the development of technologies, the liquid crystal (LC) TV set as a flat display apparatus is increasingly applied into high performance display field due to its characteristics such as small volume, low power consumption, radiation free, relatively low manufacture cost, and so on.

In prior arts, when watching TV programs, people usually use a remote controller to manipulate the LC TV set wirelessly to adjust the parameters of display pictures, volume, etc., or to change TV channels. Therefore, the function of the remote controller is relatively simple, reducing the fun in the entertainment.

SUMMARY

Embodiments of the present disclosure provides an emitting apparatus, a signal receiving apparatus, a signal processing method and a display system, wherein the remote controller can be applied with a pressure to be deformed and a remote controlling signal is transmitted to a display apparatus so as to perform image display.

Accordingly, embodiments of the present disclosure employ the following technical solutions.

According to one aspect of embodiments of the present disclosure, there is provided a signal emitting apparatus comprising:

a first receiving unit configured to receive a deformation operation input by a user, wherein the signal emitting apparatus is deformed under the deformation operation to generate a deformation quantity;

a signal generating unit configured to generate a control signal according to the deformation quantity generated by the deformation operation; and a signal transmitting unit configured to transmit the control signal to a signal receiving apparatus.

According to another aspect of embodiments of the present disclosure, there is provided a signal receiving apparatus comprising:

a second receiving unit configured to receive a control signal transmitted by a signal emitting apparatus;

a signal processing unit configured to process the control signal to obtain a deformation curve matched with the received deformation quantity of the signal emitting apparatus; and a display unit configured to display an image according to the deformation curve.

According to another aspect of embodiments of the present disclosure, there is provided a signal processing method comprising:

receiving a deformation operation input by a user such that a signal emitting apparatus is deformed under the deformation operation to generate a deformation quantity;

generating a control signal according to the deformation quantity generated by the deformation operation; and transmitting the control signal to a signal receiving apparatus.

According to another aspect of embodiments of the present disclosure, there is provided a signal processing method comprising:

receiving a control signal transmitted by a signal emitting apparatus;

processing the control signal to obtain a deformation curve matched with the received deformation quantity of the signal emitting apparatus; and displaying an image according to the deformation curve.

According to another aspect of embodiments of the present disclosure, there is provided a display system comprising the signal emitting apparatus as described in the above and the signal receiving apparatus as described in the above.

Embodiments of the present disclosure provide a signal emitting apparatus, a signal receiving apparatus, a signal processing method and a display system. The signal emitting apparatus comprises a first receiving unit configured to receive a deformation operation input by a user, wherein the signal emitting apparatus is deformed under the deformation operation to generate a deformation quantity; a signal generating unit configured to generate a control signal according to the deformation quantity; and a signal transmitting unit configured to transmit the control signal to a signal receiving apparatus. In such a way, the signal emitting apparatus can not only transmit the control signal to the signal receiving apparatus, but also be deformed under the effect of an external force, such that it is possible to increase the fun in the control or during the viewing.

BRIEF DESCRIPTION OF THE DRAWINGS

In order to more clearly explain the technical solutions in the prior art or of embodiments of the present disclosure, the accompanying drawings required to be used in the description of the embodiments or the prior art are briefly introduced hereinafter. Obviously, the drawings in the following description are only some embodiments of the present disclosure. Those skilled in the art can obtain other figures based on those figures without paying any creative work.

REFERENCE SYMBOLS

01—signal emitting apparatus; 02—signal receiving apparatus; 10—first receiving unit; 100—housing; 101—first control keyboard circuit board; 1011—digital keyboard; 102—second control keyboard circuit board; 1021—control keyboard; 103—reel; 104—conducting wire; 105—rotary switch; 106—first spring; 107—elastic deformation part; 108—second spring; 109—third spring; 120—slot; 121—screw; 20—signal generating unit; 201—first pressure sensor; 202—second pressure sensor; 203—third pressure sensor; 210—second receiving unit; 211—signal processing unit; 2110—curve drawing module; 2111—picture deformation module; 2112—pre-processing picture; 212—display unit; 30—signal transmitting unit; 301—circuit amplifying module; 302—signal sampling and converting module

DETAILED DESCRIPTION

In the following, the technical solutions in embodiments of the present disclosure will be clearly and completely described in connection with accompanying drawings of the embodiments of the present disclosure. Obviously, the described embodiments are only part of the embodiments of the present disclosure, but not all of them. All other embodiments that can be obtained by those skilled in the art based on the embodiments in the present disclosure without paying any creative work fall within the protection scope of the present disclosure.

Figure 1:
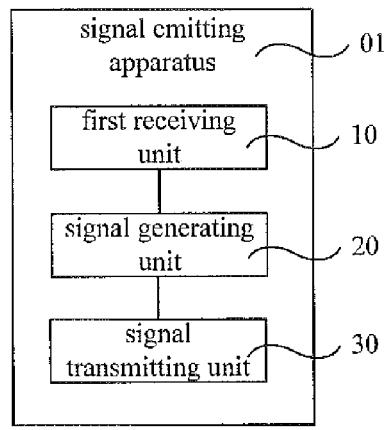
FIG. 1 is a schematic diagram illustrating a configuration of a signal emitting apparatus provided in an embodiment of the present disclosure.

An embodiment of the present disclosure provides a signal emitting apparatus 01, as illustrated in FIG. 1, wherein the signal emitting apparatus 01 comprises: a first receiving unit 10 configured to receive a deformation operation input by a user, wherein the signal emitting apparatus 01 is deformed under the deformation operation to generate a deformation quantity; a signal generating unit 20 configured to generate a control signal according to the deformation quantity generated by the deformation operation; and a signal transmitting unit 30 configured to transmit the control signal to a signal receiving apparatus 02.

It is noted that the above deformation operation input by the user can be a pressure on the signal emitting apparatus 01 applied by the user through an external force such that the signal emitting apparatus 01 is deformed. For example, an external force such as stretching force, compressing force or twisting force is applied to the signal emitting apparatus 01.

An embodiment of the present disclosure provides a signal emitting apparatus. The signal emitting apparatus comprises: a first receiving unit configured to receive a deformation operation input by a user, wherein the signal emitting apparatus is deformed under the deformation operation to generate a deformation quantity; a signal generating unit configured to generate a control signal according to the deformation quantity; and a signal transmitting unit configured to transmit the control signal to a signal receiving apparatus. In such a way, the signal emitting apparatus can not only transmit the control signal to the signal receiving apparatus, but also be deformed under the effect of an external force, such that it is possible to increase the fun during the control or during the viewing.

Figure 2:
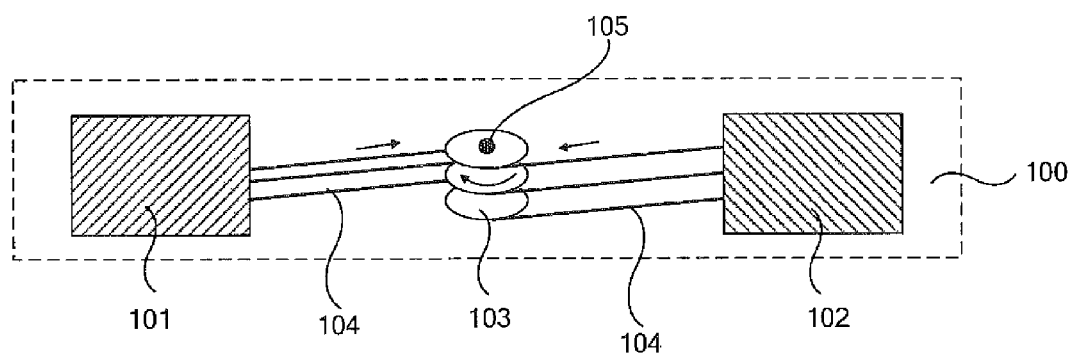
FIG. 2 is a schematic structural diagram of another signal emitting apparatus provided in an embodiment of the present disclosure.

Optionally, the above first receiving unit 10 as illustrated in FIG. 2 comprises a first control keyboard circuit board 101 and a second control keyboard circuit board 102.

A reel 103 is arranged between the first control keyboard circuit board 101 and the second control keyboard circuit board 102. The reel 103 is connected to the first control keyboard circuit board 101 and the second control keyboard 102 respectively by conducting wires 104.

When receiving the deformation operation input by the user, two ends of the first control keyboard circuit board 101 and the second control keyboard circuit board 102 are pressed or stretched such that the reel 103 rotates to change the distance between the first control keyboard circuit board 101 and the second control keyboard circuit 102.

It is noted that a remote controller is taken as an example of the signal emitting apparatus 01 in the embodiments of the present disclosure, and other types of signal emitting apparatuses 01 are not described herein but should also fall within the protection scope of the present disclosure.

Figure 3:
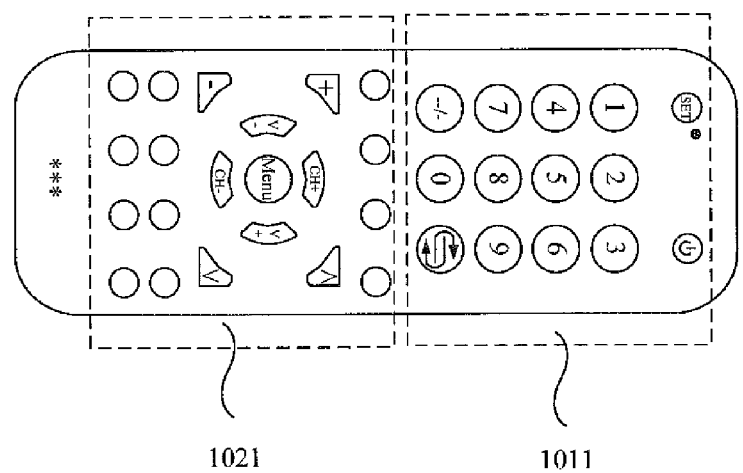
FIG. 3 is a schematic appearance diagram of another signal emitting apparatus provided in an embodiment of the present disclosure.

It is noted that by the first control keyboard circuit board 101 and the second control keyboard circuit board 102, the keyboard circuit board for receiving input remote instructions on the signal emitting apparatus 01 (remote controller) is divided into two parts. For example, as illustrated in FIG. 3, the first control keyboard circuit board 101 can be digital keyboard 1011 for inputting digital keys, and the second control keyboard circuit board 102 can be control keyboard 1021 for adjusting parameters such as volume. Alternatively, the first control keyboard circuit board 101 can be control keyboard 1021 for adjusting parameters such as volume, and the second control keyboard circuit board 102 can be digital keyboard 1011 for inputting digital keys. The digital keyboard 1011 and the control keyboard 1021 can receive remote instructions input by the user, and operate the display apparatus through the above remote instructions.

It is noted that when receiving the deformation operation input by the user, two ends of the first control keyboard circuit board 101 and the second control keyboard circuit board 102 are pressed or stretched such that the reel 103 rotates to change the distance between the first control keyboard circuit board 101 and the second control keyboard circuit 102. It can be specifically implemented as follows.

When the two ends of the first control keyboard circuit board 101 and the second control keyboard circuit board 102 are pressed, the reel 103 rotates clockwise, and a conducting wire 104 between the first control keyboard circuit board 101 and the reel 103 and a conducting wire 104 between the second keyboard circuit board 102 and the reel 103 are both wound around the reel 103, such that the distance between the first control keyboard circuit board 101 and the second control keyboard circuit board 102 is shortened.

When the two ends of the first control keyboard circuit board 101 and the second control keyboard circuit board 102 are stretched, the reel 103 rotates counter-clockwise, and the conducting wire 104 between the first control keyboard circuit board 101 and the reel 103 and the conducting wire 104 between the second keyboard circuit board 102 and the reel 103 are both unwound from the reel 103, such that the distance between the first control keyboard circuit board 101 and the second control keyboard circuit board 102 is increased.

The external force can elongate the signal emitting apparatus 01 (remote controller) to a certain distance, and the distance depends on the elastic performance index of the material forming the housing 100 of the signal emitting apparatus 01 (remote controller) and the length of the conducting wires 104. For example, given the length of the conducting wire 104, when the elasticity of the material forming the housing is high, the stretching distance of the signal emitting apparatus 01 subjected to the tension is large; when the elasticity of the material forming the housing is low, the above stretching distance is small. In particular, the housing 100 can be fabricated by PU (Polyurethane) material with certain deformation quantity, which can provide elastic deformation within a certain range of external force.

In the above, description is made by taking a case in which the signal emitting apparatus 01 is pressed, the reel 103 rotates clockwise and the conducting wires 104 are wound around the reel 103; when the signal emitting apparatus 01 is stretched, the reel 103 rotates counter-clockwise and the conducting wires 104 are unwound from the reel 103 as an example. However, it is possible to make such an arrangement that when the signal emitting apparatus 01 is pressed, the reel 103 rotates counter-clockwise and the conducting wires are wound around the reel 103; when the signal emitting apparatus 01 is stretched, the reel 103 rotates clockwise and the conducting wires are unwound from the reel 103. The deformation procedure of the signal emitting apparatus 01 in this case is the same as that described in the above, which will not be described repeatedly. Both cases should fall within the protection scope of the present disclosure. As such, the signal emitting apparatus 01 (remote controller) can be deformed under the effect of the external force input by the user, such that the fun in the entertainment can be enhanced when watching TV. For example, the audience can apply a force to deform the signal emitting apparatus 01 (remote controller) when the commercial is inserted during the TV program being watched. In such a way, the audience can move their fingers or arms when waiting for the programs to be played, increasing the fun in the waiting time.

Optionally, the first receiving unit 10 can further comprise a rotary switch 105 arranged on the reel 103.

When the rotary switch 105 is turned on, the reel 103 rotates to wind the conducting wires 104 on the reel. The distance between the first control keyboard circuit board 101 and the second control keyboard circuit 102 is shortened.

When the rotary switch 105 is turned off, the reel 103 is in a non-rotary state such that the distance between the first control keyboard circuit board 101 and the second control keyboard circuit board 102 is fixed. In other words, when the rotary switch 105 is turned off, the reel 103 cannot rotate even it is under the effect of an external force. Therefore, when the signal emitting apparatus 01 (remote controller) is stretched, the distance between the first control keyboard circuit board 101 and the second control keyboard circuit 102 is kept unchanged.

In such a way, when the rotary switch 105 is pressed, the conducting wires are automatically withdrawn back to the reel 103 during the rotation of the reel 103, and the distance between the first control keyboard circuit board 101 and the second control keyboard circuit board 102 is shortened. It is noted that the rotary switch 105 can be arranged on the surface of the housing 100 to facilitate the user's operation on it.

Optionally, the first receiving unit 10 further comprises a disable switch (not illustrated in the figure) arranged on the first control keyboard circuit board 101 and/or the second control keyboard circuit board 102.

When the disable switch is turned on, the first control keyboard circuit 101 and/or the second control keyboard circuit board 102 are in the non-operating state. That is, the keys on the first control keyboard circuit board 101 or the second control keyboard circuit board 102 are disabled such that the signal emitting apparatus 01 (remote controller) cannot perform normal TV remote controlling operations, such as adjusting the volume of the TV, change channels or the like. As such, it is possible to avoid the phenomenon in which the remote controller is operated in error when the remote controller is deformed.

In addition, when the disable switch is turned off, the first control keyboard circuit board 101 and/or the second control keyboard circuit board 102 are in the operating state. As such, when the user stops deformation operation on the remote controller, it is possible to perform normal remote controlling operation on the TV by turning off the disable switch.

Figure 4:
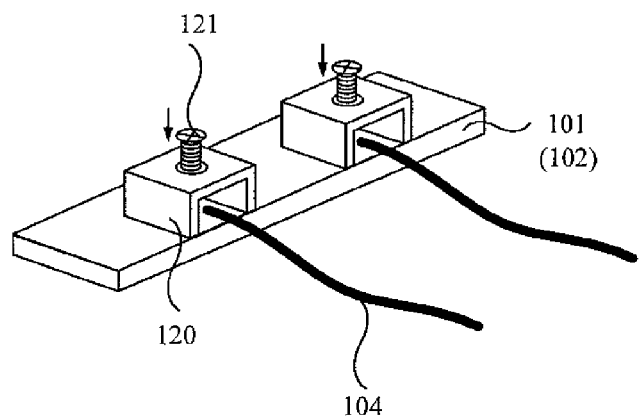
FIG. 4 is a schematic diagram of the internal connection structure of a signal emitting apparatus provided in an embodiment of the present disclosure.

Optionally, as illustrated in FIG. 4, the conducting wire 104 is fixedly connected to the first control keyboard circuit board 101 or the second control keyboard circuit board 102 through a slot 120 and a screw 121. As such, when one end of the conducting wire 104 is stretched, the conducting wire 104, which is clamped into the slot 120 through the screw 121, is fixed firmly, and is not easily to be broken due to the stretching. Therefore, it is avoided that the conducting wire 104 is broken at the connection position during the procedure of being stretched in the case in which other connection manners such as soldering are adopted.

Figure 5:
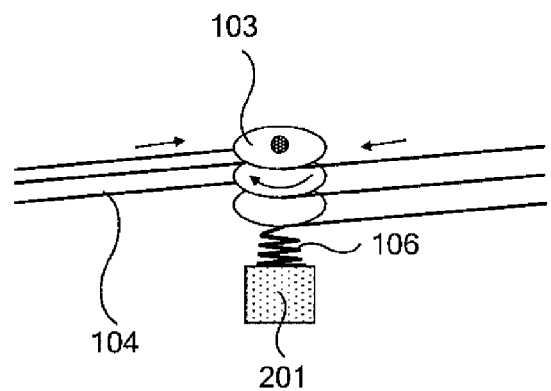
FIG. 5 is a schematic structural diagram of another signal emitting apparatus provided in an embodiment of the present disclosure.

Optionally, as illustrated in FIG. 5, the first receiving unit 10 can further comprise a first spring 106 connected to the reel 103.

The signal generating unit 20 comprises a first pressure sensor 201 connected to the first spring 106.

When the deformation operation input by the user is received, the first spring 106 is deformed, and the first pressure sensor 201 senses the rotating direction of the reel 103 according to the deforming state of the first spring 106 and converts the sensing result into an electrical signal.

In particular, when the reel 103 is not wound with the conducting wires 104, the first spring 106 connected to the reel 103 is set in a free state (i.e., a release state). Now, when the reel 103 performs clockwise rotation as illustrated by the arrow direction in FIG. 5 to wind the conducting wires 104 back to reel 103, the first spring 106 connected to the reel 103 is twisted, and is changed from the free state to a pressed state. When the first spring 106 is in the pressed state, the first pressure sensor 201 connected to the first spring 106 is pressed. A sensitive film (not illustrated in the figure) arranged in the first pressure sensor 201 receives the above pressure signal, and converts it into an electrical signal. The electrical signal can be transmitted to the signal receiving apparatus 02 as the control signal. For example, when the signal receiving apparatus 02 is a display apparatus, the above control signal can control the display apparatus to perform image displaying.

Likewise, when the reel 103 rotates counter-clockwise, the conducting wires 104 wounded on the reel 103 leave the reel 103, and the signal emitting apparatus 01 is elongated. Now, the first spring 106 in the pressed state restores to the free state gradually during the rotation of the reel 103. Therefore, the first pressure sensor 201 senses a pressure signal being weakened gradually, converts the signal into an electrical signal, and transmits the electrical signal to the signal receiving apparatus 02 as a control signal. For example, when the signal receiving apparatus 02 is a display apparatus, the above control signal can control the display apparatus to perform image displaying.

In such a way, the user can control the rotation direction of the reel 103 to stretch or shorten the signal emitting apparatus 01 such as a remote controller, in order to achieve the purpose of controlling the signal receiving apparatus 02. For example, when the remote controller is stretched or shortened, the display apparatus receives a deformation signal emitted from the remote controller and perform image displaying according to the deformation signal. When the conducting wires are unwounded from the reel 103 and the first spring 106 connected to the reel 103 is restored to the free state, the rotation direction of the reel 103 is controlled to stretch or shorten the signal emitting apparatus 01 such as a remote controller so as to control the signal receiving apparatus 02 such as a display apparatus to display image, and the procedure thereof is as described in the above, and will not be repeated here. They should all fall within the protection scope of the present disclosure.

Figure 6:
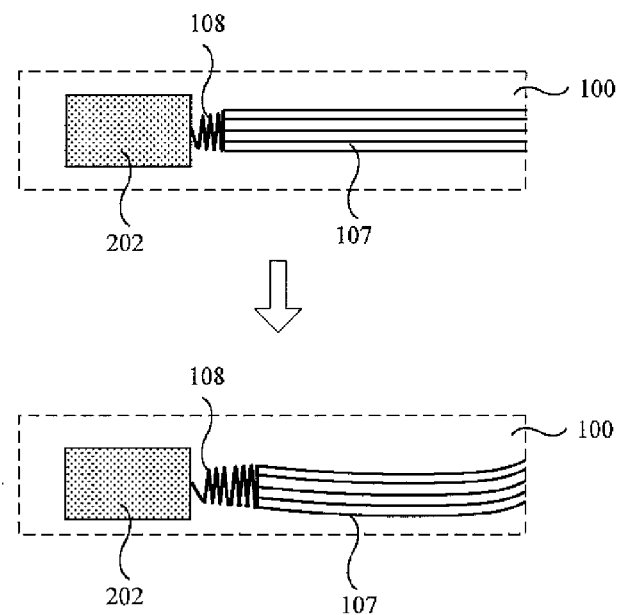
FIG. 6 is a schematic structural diagram of another signal emitting apparatus provided in an embodiment of the present disclosure.

Optionally, as illustrated in FIG. 6, the first receiving unit 10 can comprise an elastic deformation part 107 and a second spring 108 connected to one end of the elastic deformation part 107. The other end of the elastic deformation part 107 can be fixed to the housing 100. The elastic deformation part 107 can be a steel wire with a certain deformation quantity and rigidity.

The signal generating unit 20 can comprise a second pressure sensor 202 connected to the second spring 108.

When the deformation operation input by the user is received, the elastic deformation part 107 is deformed, and the second pressure sensor 202 senses the deformation degree of the elastic deformation part 107 according to the retractable/extendable state of the second spring and converts the sensing result into an electrical signal.

In particular, when the elastic deformation part 107 is not deformed, the second spring 108 is set to be in the pressed state, and at the same time, the sensitive film of the second pressure sensor 202 can receive the above pressure signal, convert the pressure signal into an electrical signal, and transmit the electrical signal to the signal receiving apparatus 02 as a control signal. For example, when the signal receiving apparatus 02 is a display apparatus, the above control signal can control the display apparatus to perform image displaying. When the signal emitting apparatus 01 bends under the effect of a external force, the elastic deformation part 107 has bending deformation and the second spring 108 in the pressed state is stretched such that the second spring 108 changes from the pressed state to a stretched state to make the sensitive film of the second pressure sensor 202 receive a pressure signal decreasing gradually and convert the pressure signal into an electrical signal. The electrical signal is transmitted to the signal receiving apparatus 02 as a control signal. For example, when the signal receiving apparatus 02 is a display apparatus, the above control signal can control the display apparatus to perform image displaying. In such a way, the user can bend the signal emitting apparatus 01 such as a remote controller to achieve the effect of controlling the display apparatus to display pictures during the viewing.

Figure 7:
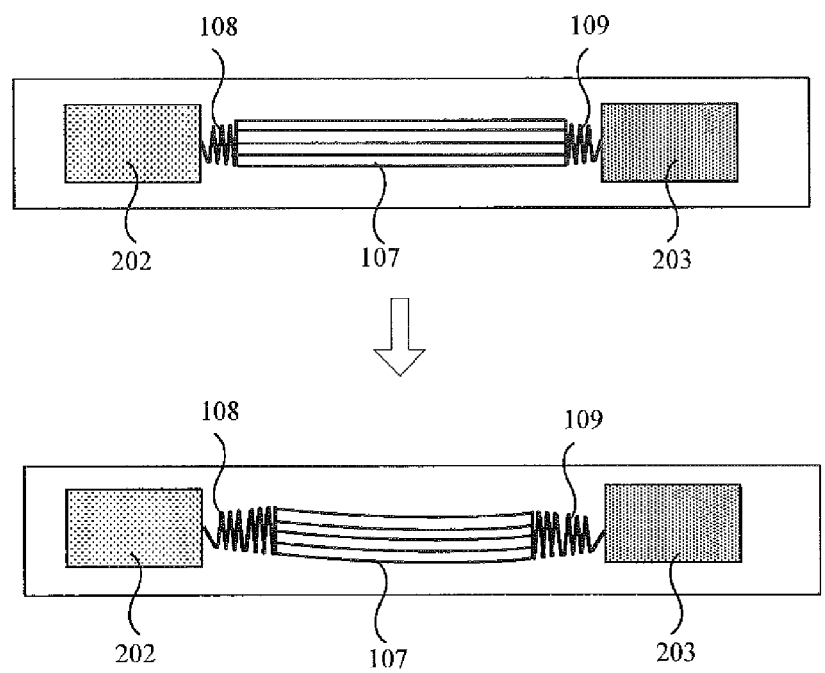
FIG. 7 is a schematic structural diagram of another signal emitting apparatus provided in an embodiment of the present disclosure.

Optionally, as illustrated in FIG. 7, the first receiving unit 10 can further comprise a third spring 109 connected to the other end of the above elastic deformation part 107.

The signal generating unit 20 can further comprise a third pressure sensor 203 connected to the third spring 109.

When the deformation operation input by the user is received, the elastic deformation part 107 is deformed, and the third pressure sensor 203 senses the deformation degree of the elastic deformation part 107 according to the retractable/extendable state of the third spring 109 and converts the sensing result into an electrical signal.

In particular, when the elastic deformation part 107 is not deformed, as illustrated in FIG. 7, the second spring 108 and the third spring 109 are set to be in the pressed state, and at the same time, the sensitive films of the second pressure sensor 202 and the third pressure sensor 203 can receive the above pressure signals respectively, and can convert the pressure signals into an electrical signal. The electrical signal can be transmitted to the signal receiving apparatus 02 as a control signal. For example, in a case in which the signal receiving apparatus 02 is a display apparatus, the above control signal can control the display apparatus to perform image displaying. When the signal receiving apparatus 01 bends under the effect of a external force, the elastic deformation part 107 has bending deformation and the second spring 108 and the third spring 109 in the pressed state are stretched such that the second spring 108 and the third spring 109 change from the pressed state to a stretched state to make the sensitive films of the second pressure sensor 202 and the third pressure sensor 203 receive pressure signals decreasing gradually and convert two pressure signals into an electrical signal. The electrical signal is transmitted to the signal receiving apparatus 02 as a control signal. For example, in a case in which the signal receiving apparatus 02 is a display apparatus, the above control signal can control the display apparatus to perform image displaying. In such a way, the user can bend the signal emitting apparatus 01 such as a remote controller to achieve the effect of controlling the display apparatus to display pictures during the viewing.

Figure 8:
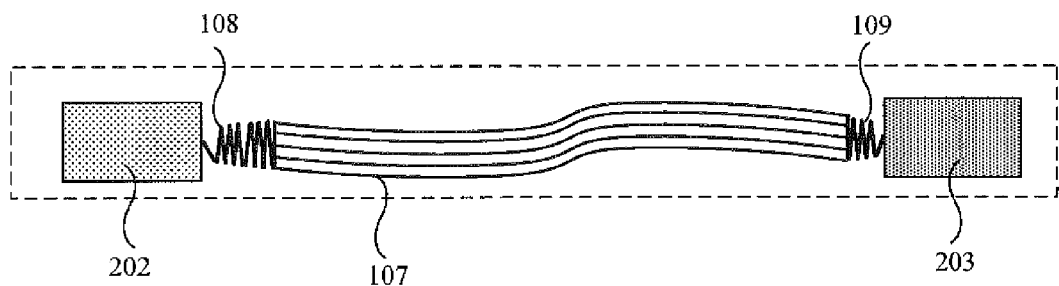
FIG. 8 is a schematic structural diagram of another signal emitting apparatus provided in an embodiment of the present disclosure.

Alternatively, when the elastic deformation part 107 is not deformed, the second spring 108 is set to be in the pressed state and the third spring 109 is set to be in the stretched state, and at the same time, the sensitive film of the second pressure sensor 202 can receive the above pressure signal, and can convert the pressure signal into an electrical signal. The electrical signal can be transmitted to the signal receiving apparatus 02 as a control signal. For example, in a case in which the signal receiving apparatus 02 is a display apparatus, the above control signal can control the display apparatus to perform image displaying. When the signal receiving apparatus 01 bends under the effect of an external force, the elastic deformation part 107 has bending deformation as illustrated in FIG. 8. The second spring 108 in the pressed state is stretched and the third spring 109 in the stretched state is compressed such that the second spring 108 changes from a pressed state to a stretched state and the third spring 109 changes from a stretched state to a pressed state. Thereby, the sensitive film of the second pressure sensor 202 receives a pressure signal decreasing gradually and the sensitive film of the third pressure sensor 203 receives a pressure signal increasing gradually. The above two pressure signals can be converted into an electrical signal. The electrical signal is transmitted to the signal receiving apparatus 02 as a control signal. For example, in a case in which the signal receiving apparatus 02 is a display apparatus, the above control signal can control the display apparatus to perform image displaying. In such a way, the user can bend the signal emitting apparatus 01 such as a remote controller to achieve the effect of controlling the display apparatus to display pictures during the viewing.

It is noted that multiple elastic deformation parts 107 can be connected with the second spring 108 and the third spring 109 in one of the following manners: all the elastic deformation parts 107 are connected to the last turn of the second spring 108 and that of the third spring 109; some of the elastic deformation parts 107 are connected to the last turn of the second spring 108 and that of the third spring 109, and the others are connected to the last but one or two turn of the second spring 108 and that of the third spring 109. The above connection manners are only examples, and other connection manners will not described repeatedly herein, but should all fall in the protection scope of the present disclosure.

Figure 9:
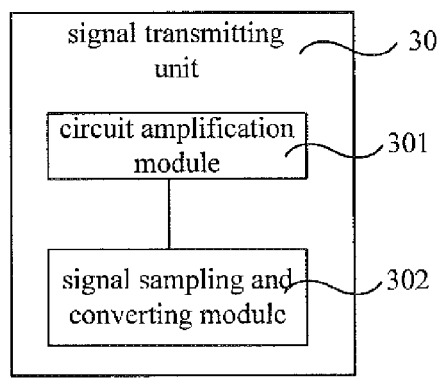
FIG. 9 is a schematic diagram illustrating a configuration of a signal transmitting unit provided in an embodiment of the present disclosure.

Optionally, as illustrated in FIG. 9, the signal transmitting unit 30 can comprise a circuit amplification module 301.

The circuit amplification module 301 is configured to amplify the signals output by the first pressure sensor 201, the second pressure sensor 202 and the third pressure sensor 203. In such a manner, the electrical signal amplified by the circuit amplification module 301 can be received by the signal receiving apparatus 02 such as a display apparatus so that the signal receiving apparatus 02 can process the signal and perforin displaying according to the processed signal. Therefore, it is possible to avoid the failure of the remote controlling procedure due to the fact that the signal output by the signal emitting apparatus 01 such as a remote controller is too small to be received by the display apparatus.

Optionally, the signal transmitting unit 30 can further comprise a signal sampling and converting module 302.

The signal sampling and converting module 302 is configured to sample the signal output by the circuit amplification module 301 and convert the same into a digital signal. In such a way, the signal receiving apparatus 02 such as a display apparatus can perform data processing on the digital signal in order to perform displaying according to the input remote controlling instruction.

Figure 10:
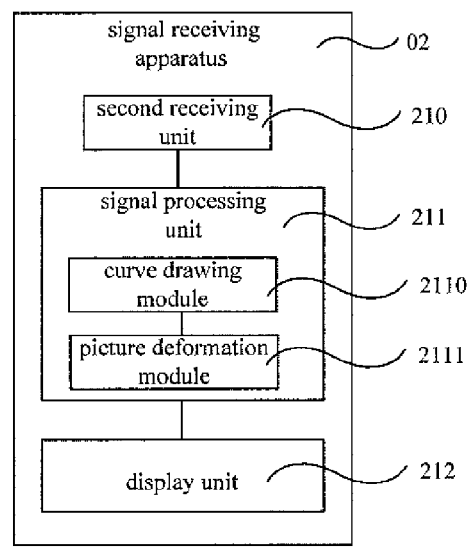
FIG. 10 is a schematic diagram illustrating a configuration of a signal receiving apparatus provided in an embodiment of the present disclosure.

An embodiment of the present disclosure provides a signal receiving apparatus 02, as illustrated in FIG. 10, which can comprise: a second receiving unit 201 configured to receive a control signal transmitted by a signal emitting apparatus 01; a signal processing unit 211 configured to process the control signal to obtain a deformation curve matched with the received deformation quantity of the signal emitting apparatus 01, wherein the shape of the deformation curve is similar to the deformation shape of the signal emitting apparatus 01; and a display unit 212 configured to display according to the deformation curve.

The embodiment of the present disclosure provides a signal receiving apparatus comprising a second receiving unit configured to receive a control signal transmitted by a signal emitting apparatus; a signal processing unit configured to process the control signal to obtain a deformation curve matched with the received deformation quantity of the signal emitting apparatus; and a display unit configured to display images according to the deformation curve. In such a way, the signal emitting apparatus can not only transmit the control signal to the signal receiving apparatus, but also be deformed under the effect of an external force. In addition, the signal receiving apparatus can display the deformation result such that it is possible to increase the fun during the control or the viewing.

Optionally, the signal processing unit 211 comprises a curve drawing module 2110.

The curve drawing module 2110 is configured to convert the data in the control signal into at least one coordinate data with the abscissa of time and the longitudinal ordinate of deformation amplitude, and smooth the coordinate data to draw a deformation curve matched with the received deformation quantity of the signal emitting apparatus 01.

In particular, for example, when the signal emitting apparatus 01 has the deformation as illustrated in FIG. 6, since the second spring 108 is stretched, the pressure sensed by the sensitive film of the second pressure sensor 202 decreases gradually. The second pressure sensor 202 can convert the above pressure signal into an electrical signal with gradually increasing amplitude, and the signal sampling and converting module 302 of the signal emitting apparatus 01 converts the above electrical signal into a digital signal and inputs it into the signal receiving apparatus 02 such as a display apparatus. The curve drawing module 2110 of the signal receiving apparatus 02 stores the data in the above digital signal into a buffer area, imports the two dimensional coordinate with the abscissa of time and the longitudinal ordinate of pressure amplitude, and then converts the data in the buffer area into at least one coordinate data in the above coordinate axes one by one in the principle of First In First Out. Finally, the curve drawing module 2110 smoothes each coordinate data such that it is possible to obtain the deformation curve matched with the received deformation quantity of the signal emitting apparatus 01.

In another example, when the signal emitting apparatus 01 has the deformation as illustrated in FIG. 8, since the second spring 108 is stretched, the pressure sensed by the sensitive film of the second pressure sensor 202 decreases gradually; since the third spring 109 is pressed, the pressure sensed by the sensitive film of the third pressure sensor 203 increases gradually. The second pressure sensor 202 can convert the above pressure signal into an electrical signal with gradually increasing amplitude; the third pressure sensor 203 can convert the above pressure signal into an electrical signal with gradually decreasing amplitude. As such, the above electrical signals both indicate that the elastic deformation part 107 near one end of the second pressure sensor 202 and one end of the third pressure sensor 203 has deformation. The signal sampling and converting module 302 of the signal emitting apparatus 01 converts the above two electrical signals into digital signals and inputs them into the signal receiving apparatus 02 such as a display apparatus. The curve drawing module 2110 of the signal receiving apparatus 02 stores two sets of data in the above digital signals into a buffer area, imports the two dimensional coordinate with the abscissa of time and the longitudinal ordinate of pressure amplitude, and then converts the two sets of data in the buffer area into two sets of coordinate data in the above coordinate axes one by one in the principle of First In First Out respectively. Then, the curve drawing module 2110 smoothes each coordinate data such that it is possible to obtain two sets of deformation curves matched with the received deformation quantity of the signal emitting apparatus 01. One set corresponds to the deformed shape of signal emitting apparatus 01 due to the deformation of the elastic deformation part 107 near one end of the second pressure sensor 202, and the other set corresponds to the deformed shape of signal emitting apparatus 01 due to the deformation of the elastic deformation part 107 near one end of the third pressure sensor 203.

Optionally, the signal processing unit 211 can further comprise a picture deformation module 2111.

The picture deformation module 2111 is configured to perform deformation processing on a pre-processing picture 2112 according to the above deformation curve.

Figure 11:
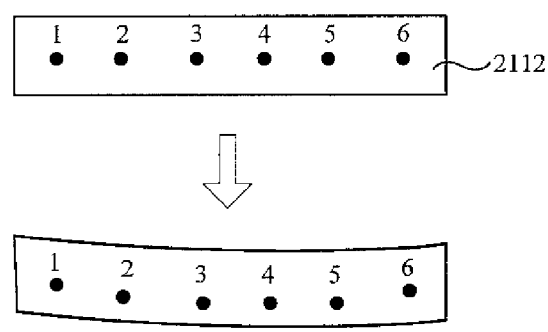
FIG. 11 is a schematic diagram for deformed displaying of a pre-processing picture provided in an embodiment of the present disclosure.

In particular, for example, when the signal emitting apparatus 01 has the deformation as illustrated in FIG. 6, the curve drawing module 2110 obtains the deformation curve matched with the deformation quantity of the signal emitting apparatus 01 and stores the same in the buffer area. As illustrated in FIG. 11, the picture deformation module 2111 receives a two dimensional pre-processing picture 2112, selects a part of points in the pre-processing picture 2112 as key points (1, 2, . . . 6), and converts them into coordinate data corresponding to the above deformation curve, such that the pre-processing picture 2112 has deformation and its deformation regularity is the same as the deformation regularity of the signal emitting apparatus 01. In such a way, when the user applies an external force to the signal emitting apparatus 01 to make it be deformed, the signal receiving apparatus 02 such as a display apparatus will display a picture with deformation (i.e. the preprocessing picture 2112 subjected to the deformation process), and the deformation regularity of the pre-processing picture 2112 is consistent with the deformation regularity of the signal emitting apparatus 01. Therefore, the fun in entertainment can be improved when watching TV, for example, the amplitude of the external force applied by the user can be reflected by the deformation quantity of the picture.

Figure 12:
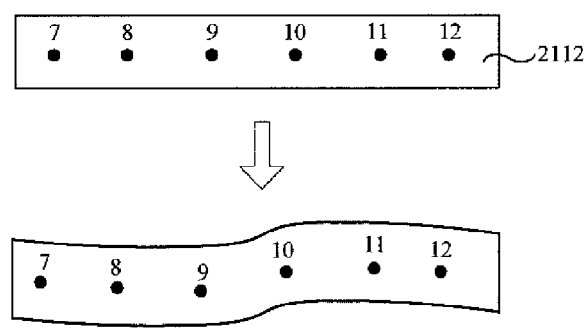
FIG. 12 is a schematic diagram for deformed displaying of another pre-processing picture provided in an embodiment of the present disclosure.

As another example, when the signal emitting apparatus 01 has the deformation as illustrated in FIG. 8, the curve drawing module 2110 obtains two sets of deformation curves matched with the deformation quantity of the signal emitting apparatus 01 and stores them in the buffer area (one set is corresponding to the deformation of signal emitting apparatus 01 due to the deformation of the elastic deformation part 107 near one end of the second pressure sensor 202, and the other set is corresponding to the deformation of signal emitting apparatus 01 due to the deformation of the elastic deformation part 107 near one end of the third pressure sensor 203). As illustrated in FIG. 12, the picture deformation module 2111 receives a two dimensional pre-processing picture 2112, selects a part of points in the pre-processing picture 2112 as key points (7, 8, . . . 12), and converts them into coordinate data corresponding to the above two sets of deformation curves, such that the pre-processing picture 2112 has deformation and its deformation regularity is the same as the deformation regularity of the signal emitting apparatus 01 with one end bending downward (In FIG. 8, the elastic deformation part 107 near one end of the second pressure sensor 202 bends downward) and the other end bending upward (In FIG. 8, the elastic deformation part 107 near one end of the third pressure sensor 203 bends upward). In such a way, when the user applies an external force to the signal emitting apparatus 01 to make it deform, the signal receiving apparatus 01 such as a display apparatus will display a picture with deformation (i.e. the pre-processing picture 2112 subjected to the deformation process), and the deformation regularity of the pre-processing picture 2112 is consistent with the deformation regularity of the signal emitting apparatus 01. Therefore, the fun in the entertainment can be improved when watching TV, for example, the amplitude of the external force applied by the user can be reflected by the deformation quantity of the picture.

Figure 13:
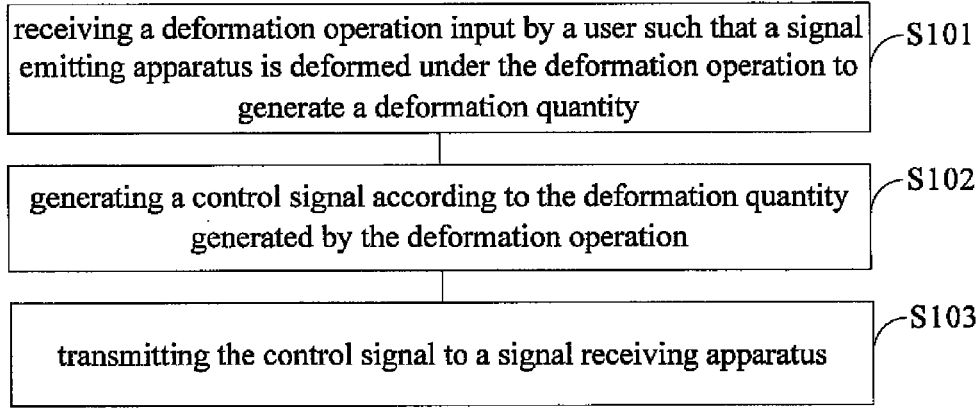
FIG. 13 is a flowchart of a signal processing method provided in an embodiment of the present disclosure.

An embodiment of the present disclosure provides a signal processing method, as illustrated in FIG. 13, comprising: a step S101 of receiving a deformation operation input by a user such that a signal emitting apparatus 01 is deformed under the deformation operation to generate a deformation quantity; a step S102 of generating a control signal according to the deformation quantity generated by the deformation operation; and a step S103 of transmitting the control signal to a signal receiving apparatus.

It is noted that the above deformation operation input by the user can be pressure to the signal emitting apparatus 01 applied by the user through an external force such that the signal emitting apparatus 01 is deformed. For example, an external force such as stretching, compressing or twisting is applied to the signal emitting apparatus 01.

The embodiment of the present disclosure provides a signal processing method comprising: receiving a deformation operation input by a user such that a signal emitting apparatus is deformed under the deformation operation to generate a deformation quantity; generating a control signal according to the above deformation quantity; and transmitting the control signal to a signal receiving apparatus. In such a way, the signal emitting apparatus can not only transmit the control signal to the signal receiving apparatus, but also be deformed under the effect of an external force, such that it is possible to increase the fun in the control or in the viewing.

Optionally, a first control keyboard circuit board 101, a second control keyboard circuit board 102, and a reel 103 are provided in the signal emitting apparatus 01, and the reel 103 is connected to the first control keyboard circuit board 101 and the second control keyboard circuit board 102 respectively by conducting wires 104.

The above step S101 can comprise: when the first control keyboard circuit board 101 and the second control keyboard circuit board 102 receive the deformation operation input by the user, two ends of the first control keyboard circuit board 101 and the second control keyboard circuit board 102 are pressed or stretched such that the reel 103 rotates to change the distance between the first control keyboard circuit board 101 and the second control keyboard circuit 102.

It is noted that a remote controller is taken as an example of the signal emitting apparatus 01 in the embodiments of the present disclosure, and other types of signal emitting apparatuses 01 are not described herein but should also fall within the protection scope of the present disclosure.

It is noted that the keyboard circuit board for receiving input remote instructions on the signal emitting apparatus 01 (remote controller) is divided into two parts via the first control keyboard circuit board 101 and the second control keyboard circuit board 102 divide. For example, as illustrated in FIG. 3, the first control keyboard circuit board 101 can be a digital keyboard 1011 for inputting digital keys, and the second control keyboard circuit board 102 can be a control keyboard 1021 for adjusting parameters such as volume. Alternatively, the first control keyboard circuit board 101 can be the control keyboard 1021 for adjusting parameters such as volume, and the second control keyboard circuit board 102 can be the digital keyboard 1011 for inputting digital keys. The digital keyboard 1011 and the control keyboard 1021 can receive remote instructions input by the user, and operate the display apparatus through the above remote instructions.

It is noted that when receiving the deformation operation input by the user, two ends of the first control keyboard circuit board 101 and the second control keyboard circuit board 102 are pressed or stretched such that the reel 103 rotates to change the distance between the first control keyboard circuit board 101 and the second control keyboard circuit 102. It can be specifically implemented as follows.

When the two ends of the first control keyboard circuit board 101 and the second control keyboard circuit board 102 are pressed, the reel 103 rotated clockwise, and the conducting wire 104 between the first control keyboard circuit board 101 and the reel 103 and the conducting wire 104 between the second keyboard circuit board 102 and the reel 103 are both wound around the reel 103, such that the distance between the first control keyboard circuit board 101 and the second control keyboard circuit board 102 is shortened.

When the two ends of the first control keyboard circuit board 101 and the second control keyboard circuit board 102 are stretched, the reel 103 rotated counter-clockwise, and the conducting wire 104 between the first control keyboard circuit board 101 and the reel 103 and the conducting wire 104 between the second keyboard circuit board 102 and the reel 103 are both unwound from the reel 103, such that the distance between the first control keyboard circuit board 101 and the second control keyboard circuit board 102 is increased.

The above external force can elongate the signal emitting apparatus 01 (remote controller) to a certain distance, and the distance depends on the elastic performance index of the material forming the housing 100 of the signal emitting apparatus 01 (remote controller) and the length of the conducting wires 104. For example, given the length of the conducting wire 104, when the elasticity of the material forming the housing is high, the stretching distance of the signal emitting apparatus 01 subjected to the stretching is large; when the elasticity of the material forming the housing is low, the above stretching distance is small. In particular, the housing 100 can be fabricated by PU (Polyurethane) material with certain deformation quantity, which can provide elastic deformation under a certain external force application.

In the above, description is made by taking a case in which when the signal emitting apparatus 01 is pressed, the reel 103 rotates clockwise and the conducting wires 104 are wound around the reel 103; when the signal emitting apparatus 01 is stretched, the reel 103 rotates counter-clockwise and the conducting wires 104 are unwound from the reel 103 as an example. However, it is possible to make such an arrangement in which when the signal emitting apparatus 01 is pressed, the reel 103 rotates counter-clockwise and the conducting wires are wound around the reel 103; when the signal emitting apparatus 01 is stretched, the reel 103 rotates clockwise and the conducting wires are unwound from the reel 103. The deformation procedure of the signal emitting apparatus 01 in this case is the same as the above, which will not be described repeatedly. Both cases should fall within the protection scope of the present disclosure. As such, the signal emitting apparatus 01 (remote controller) can be deformed under the effect of the external force input by the user, such that the fun in the entertainment can be improved when watching TV. For example, the audience can apply force to deform the signal emitting apparatus 01 (remote controller) when the commercial is inserted during the playing of the TV program. In such a way, the audience can move their fingers or arms when waiting for the programs to be played, which improving the fun during the waiting time.

Optionally, the above step S101 can further comprise: turning on a rotary switch 105 arranged on the reel 103 such that the reel 103 rotates to wind the conducting wires 104 on the reel 103. The distance between the first control keyboard circuit board 101 and the second control keyboard circuit board 102 is shortened.

Accordingly, the rotary switch 105 is turned off such that the reel 103 is in a non-rotary state to make the distance between the first control keyboard circuit board 101 and the second control keyboard circuit board 102 fixed. In other words, when the rotary switch 105 is turned off, the reel 103 cannot rotate under the effect of the external force. Therefore, when the signal emitting apparatus 01 (remote controller) is stretched, the distance between the first control keyboard circuit board 101 and the second control keyboard circuit 102 is kept unchanged.

In such a way, when the rotary switch 105 is pressed, the conducting wires are automatically wound back to the reel 103 during the rotation of the reel 103, and the distance between the first control keyboard circuit board 101 and the second control keyboard circuit board 102 is shortened. It is noted that the rotary switch 105 can be arranged on the surface of the housing 100 to facilitate the user's operation on it.

Optionally, before the above step S101, the signal processing method comprises: turning on the disable switch (not illustrated in the figure) such that the first control keyboard circuit 101 and/or the second control keyboard circuit board 102 are in the non-operating state. In other words, the keys on the first control keyboard circuit board 101 or on the second control keyboard circuit board 102 are disable such that the signal emitting apparatus 01 (remote controller) cannot perform normal TV remote controlling operations, such as adjusting the volume of the TV, change channels or the like. As such, it is possible to avoid the phenomenon of mistakenly operating the remote controller when the remote controller is deformed.

In addition, when the disable switch is turned off, the first control keyboard circuit board 101 and/or the second control keyboard circuit board 102 are in the operating state. As such, when the user stops deformation operation on the remote controller, it is possible to perform normal remote controlling operation on the TV by turning off the disable switch.

Figure 14:
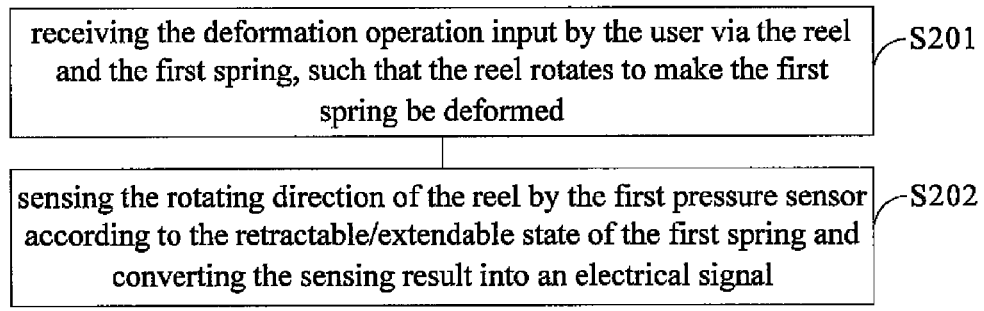
FIG. 14 is a flowchart of another signal processing method provided in an embodiment of the present disclosure.

Optionally, as illustrated in FIG. 5, a first spring 106 connected to the reel 103 and a first pressure sensor 201 connected to the first spring 106 are arranged in the signal emitting apparatus 01. As illustrated in FIG. 14, the above signal processing method can comprises: a step S201 of receiving the deformation operation input by the user, such that the reel 103 rotates to make the first spring 106 be deformed; and a step S202 of sensing the rotating direction of the reel 106 by first pressure sensor 201 according to the retractable/extendable state of the first spring 106 and converting the sensing result into an electrical signal.

In particular, when the reel 103 is not wound with the conducting wires 104, the first spring 106 connected to the reel 103 is set in a free state (i.e., a release state). Now, when the reel 103 performs clockwise rotation as illustrated by the arrow direction in FIG. 5 to wind the conducting wires 104 back to reel 103, the first spring 106 connected to the reel 103 is twisted, and is changed from the free state to a pressed state. When the first spring 106 is in the pressed state, the first pressure sensor 201 connected to the first spring 106 is pressed. A sensitive film (not illustrated in the figure) arranged in the first sensor 201 receives the above pressure signal, and converts the same into an electrical signal. The electrical signal can be transmitted to the signal receiving apparatus 02 as the control signal. For example, when the signal receiving apparatus 02 is a display apparatus, the above control signal can control the display apparatus to perform image displaying.

Likewise, when the reel 103 rotates counter-clockwise, the conducting wires 104 wound on the reel 103 are unwound from the reel 103, and the signal emitting apparatus 01 is elongated. Now, the first spring 106 in the pressed state restores to the free state gradually during the rotation of the reel 103. Therefore, the first pressure sensor 201 senses a pressure signal being weakened gradually, converts the signal into an electrical signal, and transmits the electrical signal to the signal receiving apparatus 02 as a control signal. For example, when the signal receiving apparatus 02 is a display apparatus, the above control signal can control the display apparatus to perform image displaying.

In such a way, the user can control the rotation direction of the reel 103 to stretch or shorten the signal emitting apparatus 01 such as a remote controller, in order to achieve the purpose of controlling the signal receiving apparatus 02. For example, when the remote controller is stretched or shortened, the display apparatus receives a deformation signal emitted from the remote controller and performs image displaying according to the deformation signal. When the conducting wires on the reel 103 are unwound from the reel 103 and the first spring 106 connected to the reel 103 is set in a compressed state, the rotation direction of the reel 103 is controlled to stretch or shorten the signal emitting apparatus 01 such as a remote controller so as to control the signal receiving apparatus 02 such as a display apparatus to display pictures, the procedure is similar to that described in the above, and will not be repeated here. They should all fall within the protection scope of the present disclosure.

Figure 15:
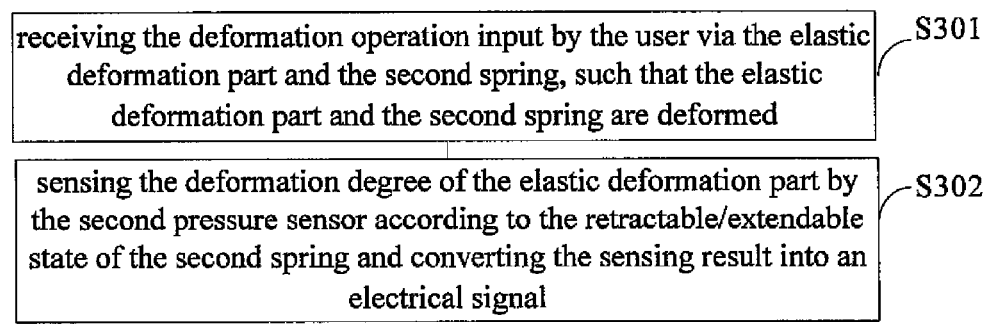
FIG. 15 is a flowchart of another signal processing method provided in an embodiment of the present disclosure.

Optionally, as illustrated in FIG. 6, an elastic deformation part 107, a second spring 108 connected to one end of the elastic deformation part 107, and a second pressure sensor 202 connected to the second spring 108 are arranged in the signal emitting apparatus 01, wherein the other end of the elastic deformation part 107 can be fixed to the housing 100. As illustrated in FIG. 15, the above signal processing method can further comprise: a step S301 of receiving the deformation operation input by the user via the elastic deformation part 107 and the second spring 108, such that the elastic deformation part 107 and the second spring 108 are deformed; and a step S302 of sensing the deformation degree of the elastic deformation part 107 via the second pressure sensor 202 according to the retractable/extendable state of the second spring 108 and converting the sensing result into an electrical signal.

In particular, when the elastic deformation part 107 is not deformed, the second spring 108 is set to be in the pressed state, and at the same time, the sensitive film of the second pressure sensor 202 can receive the above pressure signal, convert the pressure signal into an electrical signal, and transmit the electrical signal to the signal receiving apparatus 02 as a control signal. For example, when the signal receiving apparatus 02 is a display apparatus, the above control signal can control the display apparatus to perform image displaying. When the signal receiving apparatus 01 bends under the effect of a external force, the elastic deformation part 107 is bent in deformation and the second spring 108 in the pressed state is stretched such that the second spring 108 changes from the pressed state to a stretched state to make the sensitive film of the second pressure sensor 202 receive a pressure signal decreasing gradually and convert the pressure signal into an electrical signal. The electrical signal is transmitted to the signal receiving apparatus 02 as a control signal. For example, when the signal receiving apparatus 02 is a display apparatus, the above control signal can control the display apparatus to perform image displaying. In such a way, the user can bend the signal emitting apparatus 01 such as a remote controller to achieve the effect of controlling the display apparatus to display pictures during the viewing.

Figure 16:
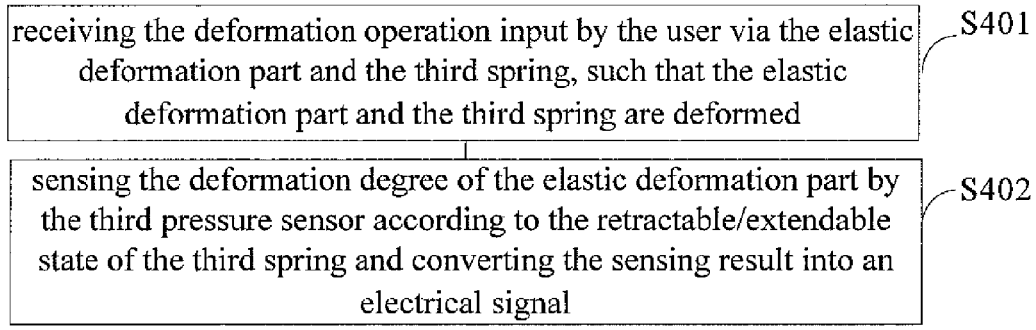
FIG. 16 is a flowchart of another signal processing method provided in an embodiment of the present disclosure.

Optionally, as illustrated in FIG. 7, a third spring 109 connected to the other end of the elastic deformation part 107 and a third pressure sensor 203 connected to the third spring 109 are arranged in the signal emitting apparatus 01. As illustrated in FIG. 16, the above signal processing method can further comprise: a step S401 of receiving the deformation operation input by the user via the elastic deformation part 107 and the third spring 109, such that the elastic deformation part 107 and the third spring 109 are deformed; and a step S402 of sensing the deformation degree of the elastic deformation part 107 by the third pressure sensor 203 according to the retractable/extendable state of the third spring 109 and converting the sensing result into an electrical signal.

In particular, when the elastic deformation part 107 is not deformed, as illustrated in FIG. 7, the second spring 108 and the third spring 109 are set to be in the pressed state, and at the same time, the sensitive films of the second pressure sensor 202 and the third pressure sensor 203 can receive the above pressure signal, and can convert the pressure signal into an electrical signal. The electrical signal can be transmitted to the signal receiving apparatus 02 as a control signal. For example, when the signal receiving apparatus 02 is a display apparatus, the above control signal can control the display apparatus to perform image displaying. When the signal receiving apparatus 01 is bent under the effect of a external force, the elastic deformation part 107 is bent in deformation and the second spring 108 and the third spring 109 in the pressed state are stretched such that the second spring 108 and the third spring 109 are changed from the pressed state to a stretched state to make the sensitive films of the second pressure sensor 202 and the third pressure sensor 203 receive a pressure signal decreasing gradually and convert the above two pressure signals into an electrical signal. The electrical signal is transmitted to the signal receiving apparatus 02 as a control signal. For example, when the signal receiving apparatus 02 is a display apparatus, the above control signal can control the display apparatus to perform image displaying. In such a way, the user can bend the signal emitting apparatus 01 such as a remote controller to achieve the effect of controlling the display apparatus to display pictures during the viewing.

Alternatively, when the elastic deformation part 107 is not deformed, the second spring 108 is set to be in the pressed state and the third spring 109 is set to be in the stretched state, and at the same time, the sensitive film of the second pressure sensor 202 can receive the above pressure signal, and can convert the pressure signal into an electrical signal. The electrical signal can be transmitted to the signal receiving apparatus 02 as a control signal. For example, when the signal receiving apparatus 02 is a display apparatus, the above control signal can control the display apparatus to perform image displaying. When the signal receiving apparatus 01 is bent under the effect of an external force, the elastic deformation part 107 is bent in deformation as illustrated in FIG. 8. The second spring 108 in the pressed state is stretched and the third spring 109 in the stretched state is compressed such that the second spring 108 is changed from the pressed state to the stretched state and the third spring 109 is changed from the stretched state to the pressed state. Thereby, the sensitive film of the second pressure sensor 202 receives a pressure signal decreasing gradually and the sensitive film of the third pressure sensor 203 receives a pressure signal increasing gradually. The above two pressure signals can be converted into an electrical signal. The electrical signal is transmitted to the signal receiving apparatus 02 as a control signal. For example, when the signal receiving apparatus 02 is a display apparatus, the above control signal can control the display apparatus to perform image displaying. In such a way, the user can bend the signal emitting apparatus 01 such as a remote controller to achieve the effect of controlling the display apparatus to display pictures during the viewing.

It is noted that multiple elastic deformation parts 107 can be connected with the second spring 108 and the third spring 109 in such manners that all the elastic deformation parts 107 are connected to the last turn of the second spring 108 and that of the third spring 109, or part of the elastic deformation parts 107 are connected to the last turn of the second spring 108 and that of the third spring 109 and the others are connected to the last but one or two turn of the second spring 108 and that of the third spring 109. The above connection manners are only examples, and other connection manners will not described repeatedly herein, but should fall in the protection scope of the present disclosure.

Optionally, the above step S103 can comprise: amplifying the signals output from the first pressure sensor 201, the second pressure sensor 202 and/or the third pressure sensor 203. In such a manner, the electrical signal amplified by the circuit amplification module 301 can be received by the signal receiving apparatus 02 such as a display apparatus in order to be processed, and the display apparatus performs displaying according to the signal. Therefore, it is possible to avoid the failure of the remote controlling procedure due to the fact that the signal output from the signal emitting apparatus 01 such as a remote controller is too small to be received by the display apparatus.

Optionally, the above step S103 can further comprise: sampling the amplified output signals of the first pressure sensor 201, the second pressure sensor 202 and/or the third pressure sensor 203 and convert them into digital signals. In such a way, the signal receiving apparatus 02 such as a display apparatus can perform data processing on the digital signals in order to perform displaying according to the input remote controlling instruction.

Figure 17:
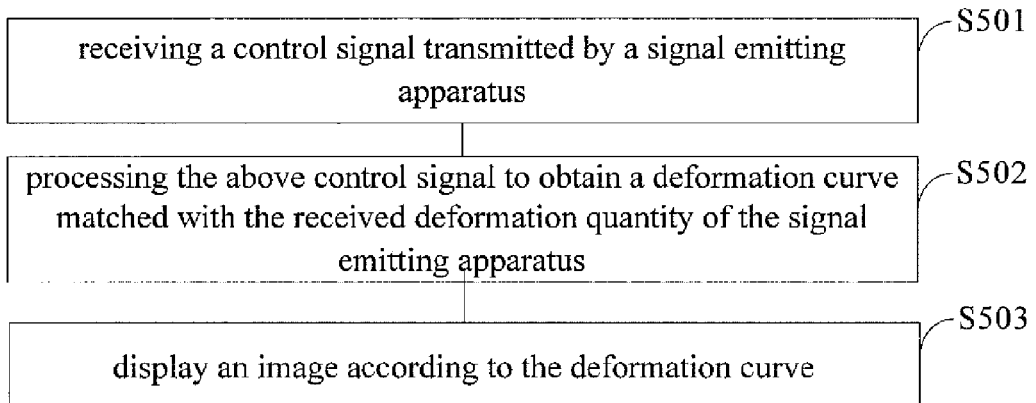
FIG. 17 is a flowchart of another signal processing method provided in an embodiment of the present disclosure.

An embodiment of the present disclosure provides another signal processing method, as illustrated in FIG. 17, which comprises: a step S501 of receiving a control signal transmitted by a signal emitting apparatus 01; a step S502 of processing the above control signal to obtain a deformation curve matched with the received deformation quantity of the signal emitting apparatus 01, wherein the shape of the deformation curve is similar to the deformation shape of the signal emitting apparatus 01; and a step S503 of displaying an image according to the deformation curve.

The embodiment of the present disclosure provides a signal processing method comprising: receiving a control signal transmitted by a signal emitting apparatus; processing the above control signal to obtain a deformation curve matched with the received deformation quantity of the signal emitting apparatus; and displaying according to the deformation curve. In such a way, the signal emitting apparatus can not only transmit the control signal to the signal receiving apparatus, but also be deformed under the effect of an external force. In addition, the signal receiving apparatus can display the deformation result such that it is possible to increase the in the control or during the viewing.

Figure 18:
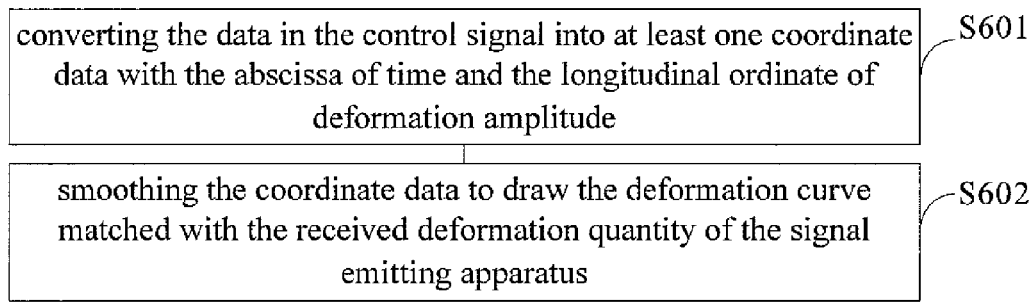
FIG. 18 is a flowchart of another signal processing method provided in an embodiment of the present disclosure.

Optionally, as illustrated in FIG. 18, the above step S502 can comprise: a step S601 of converting the data in the control signal into at least one coordinate data with the abscissa of time and the longitudinal ordinate of deformation amplitude; and a step S602 of smoothing the coordinate data to draw the deformation curve matched with the received deformation quantity of the signal emitting apparatus 01.

In particular, for example, when the signal emitting apparatus 01 has the deformation as illustrated in FIG. 6, since the second spring 108 is stretched, the pressure sensed by the sensitive film of the second pressure sensor 202 decreases gradually. The second pressure sensor 202 can convert the above pressure signal into an electrical signal with gradually increasing amplitude, and the signal sampling and converting module 302 of the signal emitting apparatus 01 converts the above electrical signal into a digital signal and inputs the same into the signal receiving apparatus 02 such as a display apparatus. The curve drawing module 2110 of the signal receiving apparatus 02 stores the data in the above digital signal into a buffer area, imports the two dimensional coordinate with the abscissa of time and the longitudinal ordinate of pressure amplitude, and then converts the data in the buffer area into at least one coordinate data in the above coordinate axes one by one in the principle of FIFO (First In First Out). Finally, the curve drawing module 2110 smoothes each coordinate data such that it is possible to obtain the deformation curve matched with the received deformation quantity of the signal emitting apparatus 01.

In another example, when the signal emitting apparatus 01 has the deformation as illustrated in FIG. 8, since the second spring 108 is stretched, the pressure sensed by the sensitive film of the second pressure sensor 202 decreases gradually; since the third spring 109 is pressed, the pressure sensed by the sensitive film of the third pressure sensor 203 increases gradually. The second pressure sensor 202 can convert the above pressure signal into an electrical signal with gradually increasing amplitude; the third pressure sensor 203 can convert the above pressure signal into an electrical signal with gradually decreasing amplitude. As such, the above electrical signals both indicate that the elastic deformation parts 107 near one end of the second pressure sensor 2002 and one end of the third pressure sensor 203 are deformed. The signal sampling and converting module 302 of the signal emitting apparatus 01 converts the above two electrical signals into digital signals and inputs them into the signal receiving apparatus 02 such as a display apparatus. The curve drawing module 2110 of the signal receiving apparatus 02 stores two sets of data in the above digital signals into a buffer area, imports the two dimensional coordinate with the abscissa of time and the longitudinal ordinate of pressure amplitude, and then converts the two sets of data in the buffer area into two sets of coordinate data in the above coordinate axes one by one in the principle of FIFO respectively. Then, the curve drawing module 2110 smoothes each coordinate data such that it is possible to obtain two sets of deformation curves matched with the received deformation quantity of the signal emitting apparatus 01. One set is corresponding to the shape of the deformation of signal emitting apparatus 01 due to the deformation of the elastic deformation part 107 near one end of the second pressure sensor 202, and the other set is corresponding to the shape of the deformation of signal emitting apparatus 01 due to the deformation of the elastic deformation part 107 near one end of the third pressure sensor 203.

Figure 19:
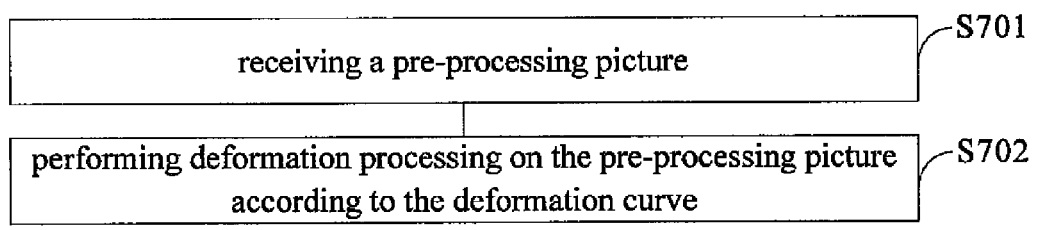
FIG. 19 is a flowchart of another signal processing method provided in an embodiment of the present disclosure.
Figure 20:
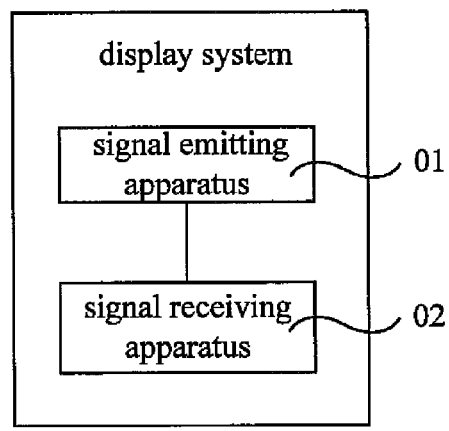
FIG. 20 is a schematic diagram illustrating a configuration of a display system provided in an embodiment of the present disclosure.

Optionally, as illustrated in FIG. 19, before the above step S503, the above signal processing method comprises: a step S701 of receiving a pre-processing picture 2112; and a step S702 of performing deformation processing on the pre-processing picture 2112 according to the deformation curve.

In particular, for example, when the signal emitting apparatus 01 has the deformation as illustrated in FIG. 6, the curve drawing module 2110 obtains the deformation curve matched with the deformation quantity of the signal emitting apparatus 01 and stores it in the buffer area. As illustrated in FIG. 11, the picture deformation module 2111 receives a two dimensional pre-processing picture 2112, selects a part of points in the pre-processing picture 2112 as key points (1, 2, ... 6), and converts them into coordinate data corresponding to the above deformation curve, such that the pre-processing picture 2112 is deformed and its deformation regularity is the same as the deformation regularity of the signal emitting apparatus 01. In such a way, when the user applies an external force to the signal emitting apparatus 01 to make it be deformed, the signal receiving apparatus 02 such as a remote controller will display a picture with deformation (i.e. the pre-processing picture 2112 subjected to the deformation process), and the deformation regularity of the pre-processing picture 2112 is consistent with the deformation regularity of the signal emitting apparatus 01. Therefore, the fun in the entertainment can be improved when watching TV, for example, the amplitude of the external force applied by the user can be reflected by the deformation quantity of the picture.

As another example, when the signal emitting apparatus 01 has the deformation as illustrated in FIG. 8, the curve drawing module 2110 obtains two sets of deformation curves matched with the deformation quantity of the signal emitting apparatus 01 and stores them in the buffer area (one set is corresponding to the deformation of signal emitting apparatus 01 due to the deformation of the elastic deformation part 107 near one end of the second pressure sensor 202, and the other set is corresponding to the deformation of signal emitting apparatus 01 due to the deformation of the elastic deformation part 107 near one end of the third pressure sensor 203). As illustrated in FIG. 12, the picture deformation module 2111 receives a two dimensional pre-processing picture 2112, selects a part of points in the pre-processing picture 2112 as key points (7, 8, ... 12), and converts them into coordinate data corresponding to the above two sets of deformation curves, such that the pre-processing picture 2112 is deformed and its deformation regularity is the same as the deformation regularity of the signal emitting apparatus 01 with one end bending downward (In FIG. 8, the elastic deformation part 107 near one end of the second pressure sensor 202 bends downward) and the other end bending upward (In FIG. 8, the elastic deformation part 107 near one end of the third pressure sensor 203 bends upward). In such a way, when the user applies an external force to the signal emitting apparatus 01 to make it be deformed, the signal receiving apparatus 02 such as a display apparatus will display a picture with deformation (i.e. the pre-processing picture 2112 subjected to the deformation process), and the deformation regularity of the pre-processing picture 2112 is consistent with the deformation regularity of the signal emitting apparatus 01. Therefore, the fun in the entertainment can be improved when watching TV, for example, the amplitude of the external force applied by the user can be reflected by the deformation quantity of the picture.

It is noted that the above signal processing method can also comprise: storing multiple pictures matched with the deformation manners in the signal receiving apparatus 02 in advance, such as elongated pictures or shrinking pictures. When the signal emitting apparatus 01 is deformed under the effect of an external force, it transmits a deformation signal to the signal receiving apparatus 02. When the signal receiving apparatus 02 receives the deformation signal, it retrieves a pre-stored picture matched with the deformation signal according the above deformation signal and performs displaying through the display unit 212.

In particular, for example, in the first receiving unit 10 (remote controller), as illustrated in FIG. 2 and FIG. 5, the first spring 106 connected to the reel 103 is set to be in the free state (i.e. the release state) when the conducting wires 104 are not wound on the reel 103. Now, when the reel 103 performs clockwise rotation as illustrated by the arrow direction in FIG. 2 to wind the conducting wires 104 to reel 103, the distance between the first control keyboard circuit board 101 and the second control keyboard circuit board 102 is shortened, and the first receiving unit 102 (remote controller) is compressed.

Then, as illustrated in FIG. 5, the first spring 106 connected to the reel 103 is twisted during the rotation of the reel 103, and is changed from the free state to the pressed state. When the first spring 106 is in the pressed state, the first pressure sensor 201 connected to the first spring 106 is pressed. The sensitive film (not illustrated in the figure) arranged in the first sensor 201 receives the above pressure signal, and converts it into an electrical signal. The electrical signal can be transmitted to the signal receiving apparatus 02 as the control signal. When the signal receiving apparatus 02 receives the above deformation signal, it can retrieve a pre-stored picture (for example, one compressed picture) matched with the deformation signal according to the deformation signal, and performs displaying through the display unit 212.

Of course, the above is only exemplary description in which the above signal processing method is applied to the first receiving unit 10 as illustrated in FIG. 2 and FIG. 5. The signal processing method can also be applied to the first receiving unit 10 provided in other embodiments of the present disclosure, which will not be described one by one herein.

An embodiment of the present disclosure provides a display system comprising any signal emitting apparatus 01 and any signal receiving apparatus 02 as described in the above. It has the same beneficial effects as the signal emitting apparatus and the signal receiving apparatus provided in the above embodiments of the present disclosure. Since the signal emitting apparatus and the signal receiving apparatus have been described in detail in the above embodiments, they will not be described repeatedly herein.

An embodiment of the present disclosure provides a display system comprising a signal emitting apparatus and a signal receiving apparatus. The signal emitting apparatus comprises: a first receiving unit configured to receive a deformation operation input by a user, wherein the signal emitting apparatus is deformed under the deformation operation to generate a deformation quantity; a signal generating unit configured to generate a control signal according to the deformation quantity; and a signal transmitting unit configured to transmit the control signal to a signal receiving apparatus. The signal receiving apparatus comprises: a second receiving unit configured to receive a control signal transmitted by a signal emitting apparatus; a signal processing unit configured to process the control signal to obtain a deformation curve matched with the received deformation quantity of the signal emitting apparatus; and a display unit configured to display according to the deformation curve. In such a way, the signal emitting apparatus can not only transmit the control signal to the signal receiving apparatus, but also be deformed under the effect of an external force; in addition, the signal receiving apparatus can display the deformation result; therefore, it is possible to increase the fun in the control or during the viewing.

Those skilled in the art can understand that all or part steps of the above method embodiments can be implemented by a program instructing related hardware. The above program can be stored in a computer readable storage medium. When the program is executed, the steps included in the above method are performed. The above storage medium includes various media that can store program codes, such as ROM, RAM, magnetic disks or optical disks.

The above descriptions are only specific implementations of the present disclosure, but the protection scope of the present disclosure is not limited to this. Changes or replacements that can be easily devised by those skilled in the art within the technical scope of the present disclosure should fall within the protection scope of the present disclosure. Therefore, the protection scope of the present disclosure should be defined by the accompanying claims.

The present application claims the priority of Chinese Patent Application No. 201410129453.4 filed on Apr. 1, 2014, and the entire content of which is incorporated as part of the present application by reference.

What is claimed is:

1. A signal emitting apparatus
configured to receive a deformation operation input by a user and to be deformed under a deformation operation to generate a deformation quantity, the signal emitting apparatus comprising:
at least one sensor configured to generate a control signal according to the deformation quantity generated by the deformation operation; and
a signal transmitter configured to transmit the control signal to a signal receiving apparatus,
wherein the signal emitting apparatus is a remote controller and the signal receiving apparatus is a display device,
wherein the signal emitting apparatus comprises a first control keyboard circuit board and a second control keyboard circuit board configured to receive a remote instruction input from the user,
wherein a reel is arranged between the first control keyboard circuit board and the second control keyboard circuit board, and the reel is connected to the first control keyboard circuit board and the second control keyboard circuit board respectively by conducting wires, and
wherein when the deformation operation input by the user is received, two ends of the first control keyboard circuit board and the second control keyboard circuit board are pressed or stretched such that the reel rotates to change a distance between the first control keyboard circuit board and the second control keyboard circuit board, wherein the distance depends on an elastic performance index of a material forming a housing of the signal emitting apparatus.

2. The signal emitting apparatus according to claim 1, further comprising a rotary switch arranged on the reel,
wherein when the rotary switch is turned on, the reel rotates to wind the conducting wires on the reel, and
wherein when the rotary switch is turned off, the reel is in a non-rotary state such that the distance between the first control keyboard circuit board and the second control keyboard circuit board is fixed.

3. The signal emitting apparatus according to claim 1, further comprising a disable switch arranged on the first control keyboard circuit board and/or on the second control keyboard circuit board;
wherein when the disable switch is turned on, the first control keyboard circuit board and/or the second control keyboard circuit board are in a non-operating state; and
when the disable switch is turned off, the first control keyboard circuit board and/or the second control keyboard circuit board are in an operating state.

4. The signal emitting apparatus according to claim 1, wherein a conducting wire is fixedly connected to the first control keyboard circuit board or the second control keyboard circuit board through a slot and a screw.

5. The signal emitting apparatus according to claim 1, comprising a first spring connected to the reel,
wherein the at least one sensor comprises a first pressure sensor connected to the first spring; and
wherein when the deformation operation input by the user is received, the first spring is deformed, and the first pressure sensor senses a rotating direction of the reel according to a retractable/extendable state of the first spring and converts a sensing result into an electrical signal.

6. The signal emitting apparatus according to claim 5, further comprising an elastic deformation part and a second spring connected to one end of the elastic deformation part,
wherein the at least one sensor comprises a second pressure sensor connected to the second spring, and
wherein when the deformation operation input by the user is received, the elastic deformation part is deformed, and the second pressure sensor senses deformation degree of the elastic deformation part according to the retractable/extendable state of the second spring and converts the sensing result into an electrical signal.

7. The signal emitting apparatus according to claim 6, further comprising a third spring connected to the other end of the elastic deformation part,
wherein the at least one sensor further comprises a third pressure sensor connected to the third spring, and
wherein when the deformation operation input by the user is received, the elastic deformation part is deformed, and the third pressure sensor senses the deformation degree of the elastic deformation part according to the retractable/extendable state of the third spring and converts the sensing result into an electrical signal.

8. The signal emitting apparatus according to claim 7, wherein the signal transmitter comprises a circuit amplifier configured to amplify signals output by the first pressure sensor, the second pressure sensor and/or the third pressure sensor.

9. The signal emitting apparatus according to claim 8, wherein the signal transmitter comprises a signal sampling and converting circuit; and
the signal sampling and converting circuit is configured to sample a signal output from the circuit amplifier and convert the same into a digital signal.

10. A signal receiving apparatus comprising:
a receiver configured to receive a control signal transmitted by a signal emitting apparatus;
a signal processor configured to process the control signal to obtain a deformation curve matched with a received deformation quantity of the signal emitting apparatus; and
a display configured to display an image according to the deformation curve,
wherein the signal emitting apparatus is a remote controller and the signal receiving apparatus is a display device,
wherein a first control keyboard circuit board, a second control keyboard circuit board, and a reel are arranged in the signal emitting apparatus, and the reel is connected to the first control keyboard circuit board and the second control keyboard circuit board respectively by conducting wires, and
wherein when a deformation operation input by a user is received, two ends of the first control keyboard circuit board and the second control keyboard circuit board are pressed or stretched such that the reel rotates to change a distance between the first control keyboard circuit board and the second control keyboard circuit board, wherein the distance depends on an elastic performance index of a material forming a housing of the signal emitting apparatus.

11. The signal receiving apparatus according to claim 10, wherein the signal processor is configured to convert the data in the control signal into at least one coordinate data with an abscissa of time and a longitudinal ordinate of deformation amplitude, and smooth the coordinate data to draw the deformation curve matched with the received deformation quantity of the signal emitting apparatus.

12. The signal receiving apparatus according to claim 11, wherein the signal processor is further configured to perform deformation processing on a pre-processing picture according to the deformation curve.

13. A signal processing method comprising:
receiving a deformation operation input by a user such that a signal emitting apparatus is deformed under a deformation operation to generate a deformation quantity;
generating a control signal according to the deformation quantity; and
transmitting the control signal to a signal receiving apparatus,
wherein the signal emitting apparatus is a remote controller and the signal receiving apparatus is a display device,
wherein a first control keyboard circuit board, a second control keyboard circuit board, and a reel are arranged in the signal emitting apparatus, and the reel is connected to the first control keyboard circuit board and the second control keyboard circuit board respectively by conducting wires, and
wherein when the deformation operation input by the user is received, two ends of the first control keyboard circuit board and the second control keyboard circuit board are pressed or stretched such that the reel rotates to change a distance between the first control keyboard circuit board and the second control keyboard circuit board, wherein the distance depends on an elastic performance index of a material forming a housing of the signal emitting apparatus.

14. The signal processing method according to claim 13, wherein the receiving the deformation operation input by the user such that the signal emitting apparatus is deformed under the deformation operation further comprises:
turning on a rotary switch arranged on the reel such that the reel rotates to wind conducting wires on the reel; or
turning off the rotary switch, such that the reel is in a non-rotary state to make the distance between the first control keyboard circuit board and the second control keyboard circuit board be fixed.

15. The signal processing method according to claim 13, wherein before receiving the deformation operation input by the user such that the signal emitting apparatus is deformed under the deformation operation, the method comprises:
turning on a disable switch such that the first control keyboard circuit board and/or the second control keyboard circuit board are in a non-operating state.

16. The signal processing method according to claim 13, wherein a first spring connected to the reel and a first pressure sensor connected to the first spring are arranged in the signal emitting apparatus, the method further comprising:
receiving the deformation operation input by the user, such that the reel rotates to make the first spring be deformed; and
sensing a rotating direction of the reel by the first pressure sensor according to a retractable/extendable state of the first spring and converting a sensing result into an electrical signal.

17. The signal processing method according to claim 16, wherein an elastic deformation part, a second spring connected to one end of the elastic deformation part, and a second pressure sensor connected to the second spring are arranged in the signal emitting apparatus, the method further comprising:
receiving the deformation operation input by the user, such that the elastic deformation part and the second spring are deformed; and
sensing deformation degree of the elastic deformation part by the second pressure sensor according to the retractable/extendable state of the second spring and converting the sensing result into an electrical signal.

18. The signal processing method according to claim 17, wherein a third spring connected to the other end of the elastic deformation part and a third pressure sensor connected to the third spring are arranged in the signal emitting apparatus, the method further comprising:
receiving the deformation operation input by the user, such that the elastic deformation part and the third spring are deformed; and
sensing the deformation degree of the elastic deformation part by the third pressure sensor according to the retractable/extendable state of the third spring and converting the sensing result into an electrical signal.

\* \* \* \* \*